(12) United States Patent
Boss

(10) Patent No.: US 8,763,221 B1
(45) Date of Patent: Jul. 1, 2014

(54) EXPANDING MECHANICAL SEPARATOR DEVICE AND METHOD

(76) Inventor: Richard Joseph Boss, Redmond, WA (US)

( * ) Notice: Subject to any disclaimer, the term of this patent is extended or adjusted under 35 U.S.C. 154(b) by 576 days.

(21) Appl. No.: 12/764,327

(22) Filed: Apr. 21, 2010

Related U.S. Application Data

(60) Provisional application No. 61/284,012, filed on Dec. 11, 2009.

(51) Int. Cl.
*B23P 19/00* (2006.01)
*B23P 19/04* (2006.01)

(52) U.S. Cl.
USPC ............................................. 29/235; 29/239

(58) Field of Classification Search
USPC .......... 29/239, 244, 253, 256, 264, 700, 235;
411/354, 383, 384, 385; 606/300, 301,
606/304, 310, 313, 314
See application file for complete search history.

(56) References Cited

U.S. PATENT DOCUMENTS

| | | | | | |
|---|---|---|---|---|---|
| 2,388,273 | A | * | 11/1945 | Lord ............................... | 411/266 |
| 3,074,746 | A | * | 1/1963 | Shames et al. ................... | 285/8 |
| 3,120,700 | A | * | 2/1964 | Chuplis, Jr. ..................... | 29/726 |
| 3,298,725 | A | * | 1/1967 | Boteler .......................... | 403/282 |
| 3,611,539 | A | * | 10/1971 | Meadh, Jr. ....................... | 29/265 |
| 3,703,119 | A | | 11/1972 | Lerich | |
| 3,799,027 | A | | 3/1974 | Galloway | |
| 3,835,522 | A | * | 9/1974 | Ward .............................. | 29/239 |
| 4,015,324 | A | * | 4/1977 | Lutter ............................ | 29/239 |
| 4,087,896 | A | * | 5/1978 | Salter ............................. | 29/256 |
| 4,338,054 | A | * | 7/1982 | Dahl ............................. | 411/424 |
| 4,724,608 | A | * | 2/1988 | Parrott .......................... | 29/724 |
| 5,090,857 | A | * | 2/1992 | Dunn ........................... | 411/385 |
| 5,609,454 | A | * | 3/1997 | Lee ............................... | 411/384 |
| 5,634,754 | A | * | 6/1997 | Weddendorf ................. | 411/354 |
| 6,536,088 | B1 | | 3/2003 | Chiang | |
| 6,840,074 | B2 | * | 1/2005 | Kamino et al. .................. | 72/95 |
| 7,878,748 | B2 | * | 2/2011 | Townsend .................... | 411/424 |

OTHER PUBLICATIONS

Deterco Mountz Products, "Flange Separator." http://www.deterco.com/products/Mountz/mountz_torque/mountz_torque_1_10.htm.

* cited by examiner

*Primary Examiner* — Brian Glessner
*Assistant Examiner* — Jessie Fonseca
(74) *Attorney, Agent, or Firm* — Dwayne E. Rogge; Schacht Law Office, Inc.

(57) ABSTRACT

This disclosure describes a tool or a family of tools which will provide mechanical force to separate pieces, plates, or parts of machinery or other assemblies which, although de-fastened, still resist separation. This is accomplished by utilizing a bolt-like device and a plurality of gripping inserts, which provide separating force between a plurality of plates or similar structures when the device is operated properly.

5 Claims, 13 Drawing Sheets

EXPANDING MECHANICAL SEPARATOR DEVICE AND METHOD

RELATED APPLICATIONS

This application claims priority benefit of U.S. Ser. No. 61/284,012, filed Dec. 11, 2009.

BACKGROUND OF THE DISCLOSURE

Field of the Disclosure

This disclosure relates to the field of tools utilized to separate pieces or parts of machinery or other assemblies which resist separation after removal of any physical fasteners such as for example bolts, or screws.

SUMMARY OF THE DISCLOSURE

This disclosure describes a tool, or a family of tools, which will provide mechanical force to separate pieces, plates, or parts of machinery or other assemblies which, although defastened, still resist separation.

It occurs frequently in all types of machine and apparatus repair, replacement, modification, or dismantling, etc, that two pieces of material (usually metal, but could be all sorts of materials such as plastic, wood, stone, composites, etc) which have been attached together need to be separated. These pieces might be plates, parts, bosses, covers, bearing holders, or any other type of pieces that, for any reason, may have been attached or fitted together to form, or complete the form of, some type of assembly. To define this broad group of components, the term plates will be utilized.

It also occurs frequently that, due to many varied and differing factors, that even once all the bolts, screws, rivets, etc. which were used to hold the plates together have been removed, the individual plates remain firmly together, and resist multiple efforts to separate them. This may be due to oxidation such as rust, adhesives, electrolysis, gaskets, or other factors.

Many, many differing forms of "persuasion" have been used over the centuries of the machine in efforts to try to separate plates which have become "stuck" together during their assembled or fitted history, and now resist separation. Men have used hammering force, wedges, pry-bars, heat, cold, vibration, and many other adaptations A very common effort, for instance, is to try to drive the tip of a screwdriver or other tool in between the adjoining faces of the plates in the hope of wedging a gap between the faces which can then be made wider by driving in a bigger screwdriver/wedge and attempting to pry the faces apart. Millions of screwdrivers and other tools have been broken in these efforts, and the faces of millions of plates have been damaged or ruined by the gashes created by having sharp tools forced and hammered into them.

This disclosure provides an effective, sensible, tool to assist in separating such plates in a manner which significantly reduces the frustration and time required, increases the success, and does not damage the plates which are being removed.

The basic idea of one embodiment is to make a tool which uses the threads already present in one of the plates, or which will be "created" by the tool, to create a measured and gradual force which can, through the use of the tool, be used to separate the plates.

Disclosed herein is a tool for physically separating a plurality of plates; the apparatus comprising in one form: a modified bolt comprising a first end threaded portion and a second end non-cylindrical head portion longitudinally opposed to the threaded portion; wherein the threaded portion is configured to interoperate with a borehole within a first plate of the plurality of plates to be separated; the modified bolt comprising a smooth surface tapered region between the threaded portion and the head portion, with the taper narrowing in diameter toward the head portion; a plurality of gripping inserts having an inner frustoconical surface operably configured to interoperate with the smooth surface tapered region of the modified bolt; wherein the gripping inserts further comprise an outer surface having a toothed surface configured to engage an inner surface of a borehole within a second of the plurality of plates; and wherein the tool is configured to exert tensile forces between the first plate and the second plate when operated.

The tool as recited may also be produced in a form wherein the modified bolt further comprises a smooth surface cylindrical region longitudinally positioned between the head portion and the tapered region.

In one form, the tool described above further comprising a split tube having an inner diameter substantially equivalent to an outer diameter of the smooth surface cylindrical region to interoperate therewith.

The tool described may further comprise a plurality of bearings positioned between the gripping inserts and the smooth surface tapered region of the modified bolt. In one form, the bearings are needle bearings.

The tool disclosed may further comprise: a tapered element having internal female threads; wherein the internal female threads are configured to interoperate with the threaded portion of the modified bolt.

In another embodiment, the tool disclosed herein may further comprise: a dual threaded nut having right hand female internal threads, and left hand female internal threads; wherein the dual threaded nut is operatively configured to provide separation forces between the plurality of plates when the threaded nut is rotated relative to both the right hand female internal threads, and left hand female internal threads.

In yet another embodiment, a tool for physically separating a plurality of plates is disclosed comprising: a modified bolt comprising a lower threaded portion and an upper end non-cylindrical head portion longitudinally opposed to the lower threaded portion; wherein the lower threaded portion is configured to interoperate with a borehole within a first plate of the plurality of plates to be separated; the modified bolt comprising a smooth surface tapered region between the lower threaded portion and the head portion, with the taper narrowing increasing in diameter toward the head portion; a plurality of gripping inserts having an inner frustoconical surface operably configured to interoperate with the smooth surface tapered region of the modified bolt; a nut having internal threads operatively configured to engage an upper threaded portion of the bolt and a channel configured to engage a protrusion on the gripping inserts so as to retain the vertical relative position between the gripping inserts and the nut as the gripping inserts rotate relative to the nut; wherein the gripping inserts further comprise an outer surface having a toothed surface configured to engage an inner surface of a borehole within a second of the plurality of plates; and wherein the tool is configured to exert tensile forces between the first plate and the second plate when operated.

DESCRIPTION OF THE PREFERRED EMBODIMENTS

Figure 1:
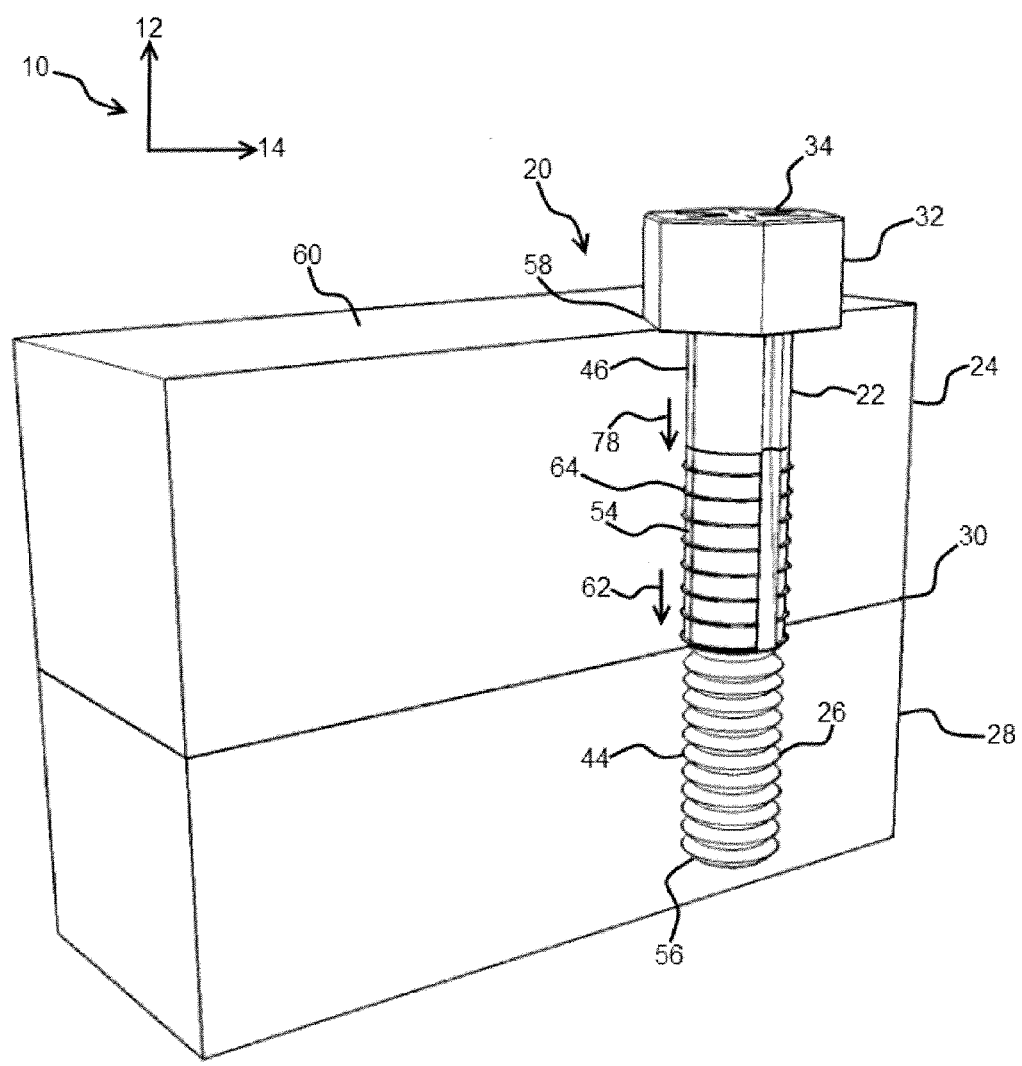
FIG. 1 is an isometric view of one embodiment of the disclosure with the plates shown in a cutaway view.

The first disclosed embodiment of the disclosure consists of a plurality of interoperating parts comprising the tool 20, as shown in FIG. 1. As shown, the tool 20 is inserted through a smooth borehole 22 within a non-threaded plate 24, and also into a threaded hole 26 within a threaded plate 28. As previously described, the plates 24 and 28 have had the previous fasteners removed, however, the adjoining surfaces 30 are still connected, such as by adhesive, oxidation (rust), gaskets, or other contaminants.

Figure 7:
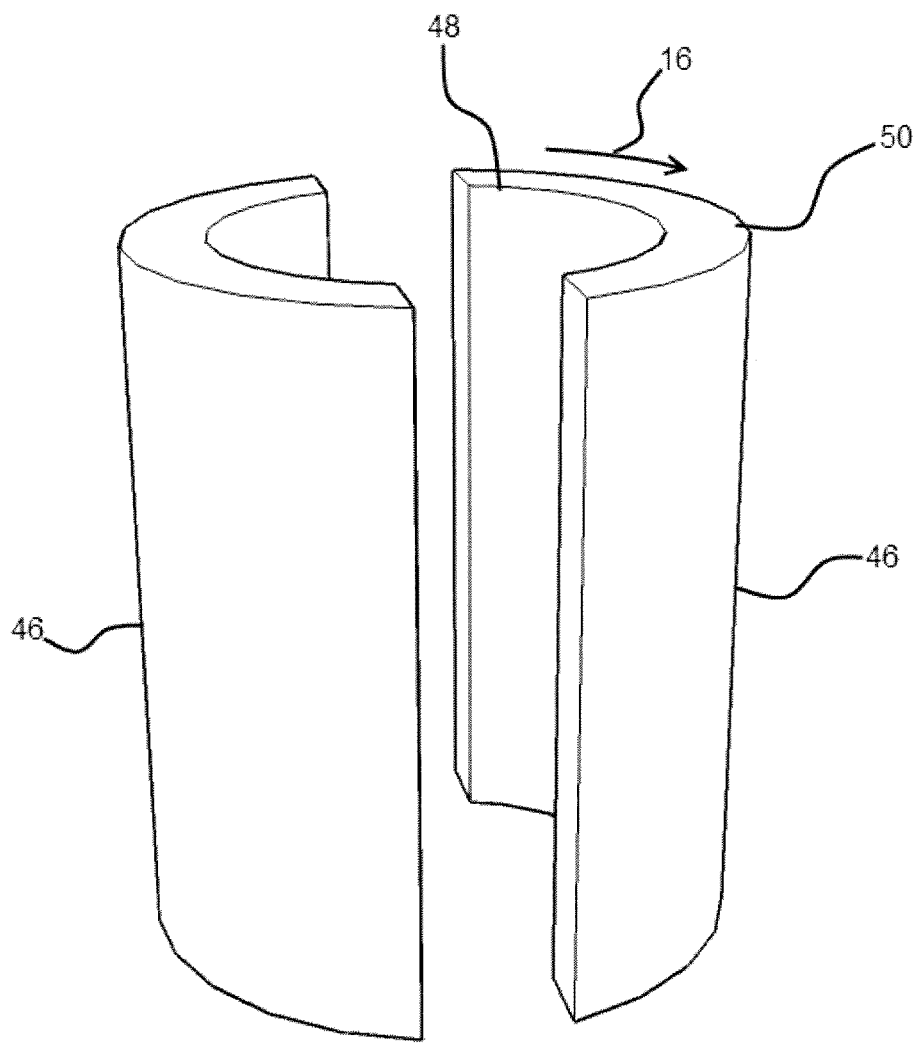
FIG. 7 is an isometric detail view of the split tube in one form

Before beginning a detailed description of the embodiments, an axis system 10 is shown, comprising a longitudinal axis 12 and a radially outward axis 14. Also, as shown in FIG. 7, a circumferential axis 16 is shown, which is generally circular in nature and centered about the long axis of the tool 20.

Figure 3:
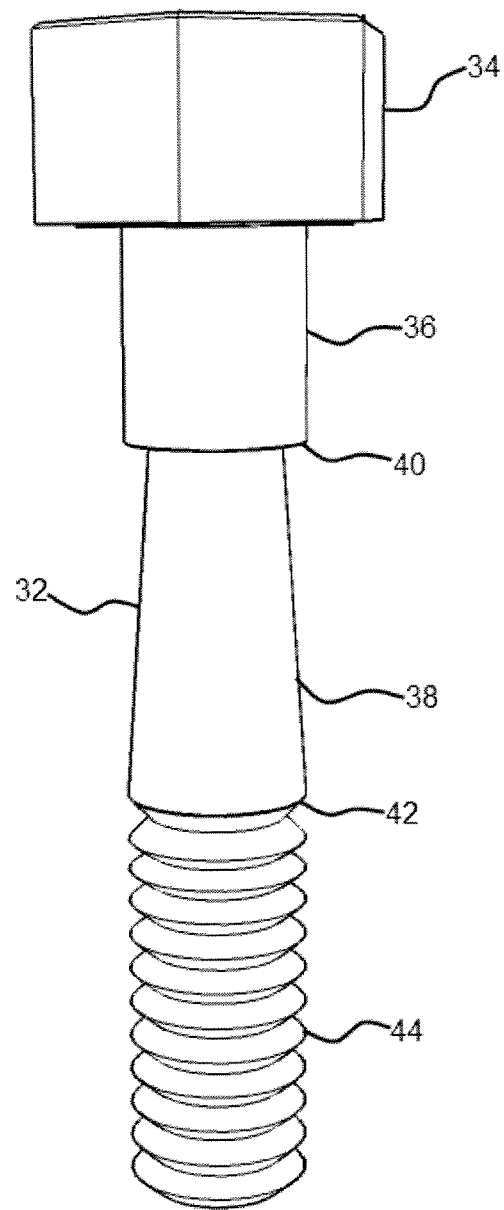
FIG. 3 is an isometric view of one embodiment of the disclosure with the plates and jaws removed.

Returning to FIG. 1, the tool 20 comprises several interoperating parts, the largest of which is a modified bolt 32. One embodiment of this bolt is shown in more detail in FIG. 3 having a head portion 34, which as shown is hexagonal in cross-section, however, it need only be configured so as to utilize mechanical means for turning the bolt 32. Longitudinally below the head portion 34 is a cylindrical region 36, having a smooth outer surface for use as described later. A tapered region or cone 38 is also shown between the lower edge 40 of the cylindrical region and an upper edge 42 of a threaded region 44. In this form, the cylindrical region 36 will be slightly smaller in diameter than the hole 22, and the non-threaded plate 24 and the threaded region 44 will be configured to interoperate with the threaded hole 26 of the threaded plate 28, such as is well known in the art. In another form, shown in FIG. 4, the cylindrical region 36 has a diameter quite smaller than the smooth borehole 22, to allow a plurality of split tube members 46, such as shown in FIG. 7, to be positioned upon the cylindrical region 36a. In this embodiment, the inner diameter 48 of the split tube 46 will be substantially the same as the outer diameter of the cylindrical region 36a, and additionally, the outer diameter 50 will be substantially equivalent to the outer diameter 52 of the jaws 54. The jaws 54 and their use will be described in more detail and can be utilized as a single element, or a plurality of elements such as a group of 2, 3, or more individual jaws.

Figure 8:
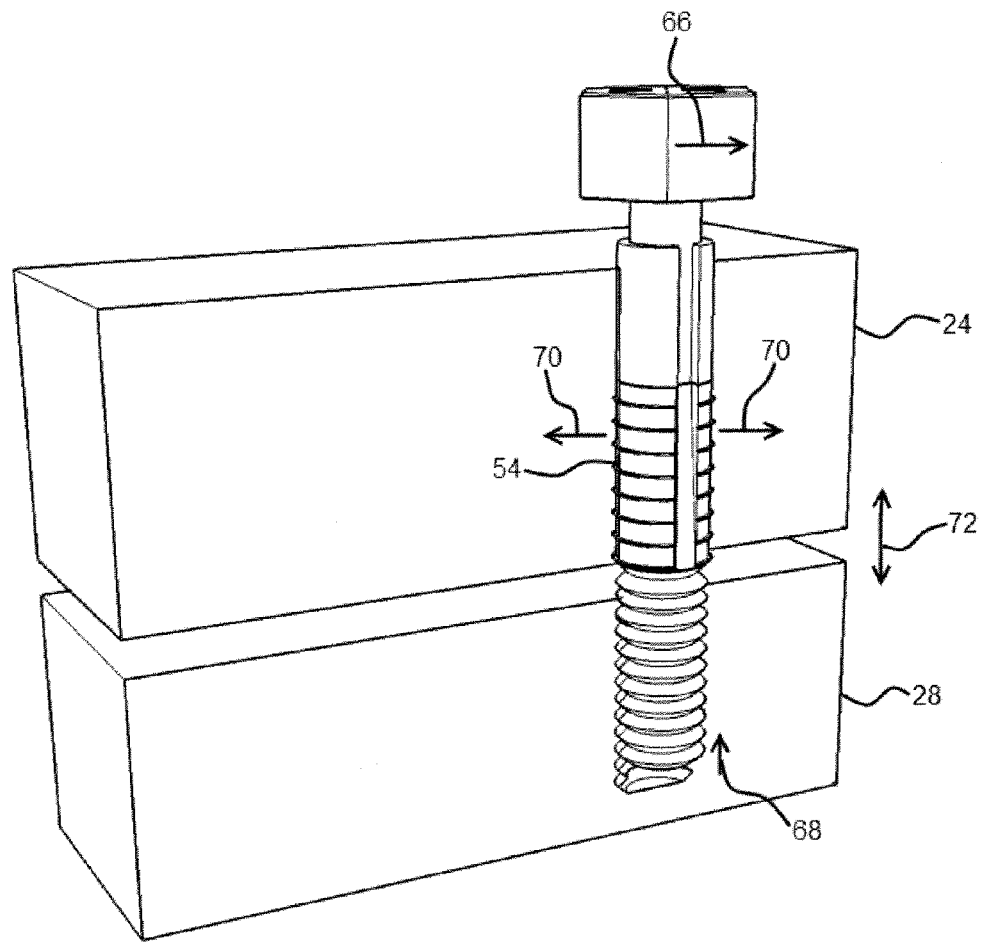
FIG. 8 is an isometric view of the tool in one form being used to separate a plurality of plates.

To utilize the tool in one form, as previously mentioned, the bolts holding a plurality of plates 24 and 28 are removed, at which time the tool 20 is inserted through the smooth borehole 22 and into the threaded hole 26. It is obviously not necessary that the bolt 32 "bottom out" at the bottom end 56 of the threaded hole 26, nor is it important that the lower edge 58 of the head portion 34 be in contact with the upper surface 60 of the plate 24. However, it is important that the jaws 54 not extend into the threaded plate 28. Once properly in position, the jaws 54 are forced downward 62, and as the jaws 54 engage the tapered region 38, such downward force forces the jaws 54 radially outward, such that the teeth 64 bite into the inner diameter of the smooth borehole 22. Thus, when the head portion 34 is rotated such as to remove the threaded region 44 of the tool 20 from the threaded hole 26, as shown in FIG. 8, the plates 24 and 28 begin to disengage. As right hand threads are most common in the art, the bolt 32 will be rotated in direction 66, thus resulting in longitudinal travel in the direction 68, thus exerting additional force outward 70 between the jaws 54 and the plate 24. Of course the device could be configured to utilize left hand threads. As the bolt 32 rotates within the jaws 54, substantial force is exerted in opposing directions as shown at 72 between the plates, and when sufficient force is exerted, the plates will separate.

Figure 2:
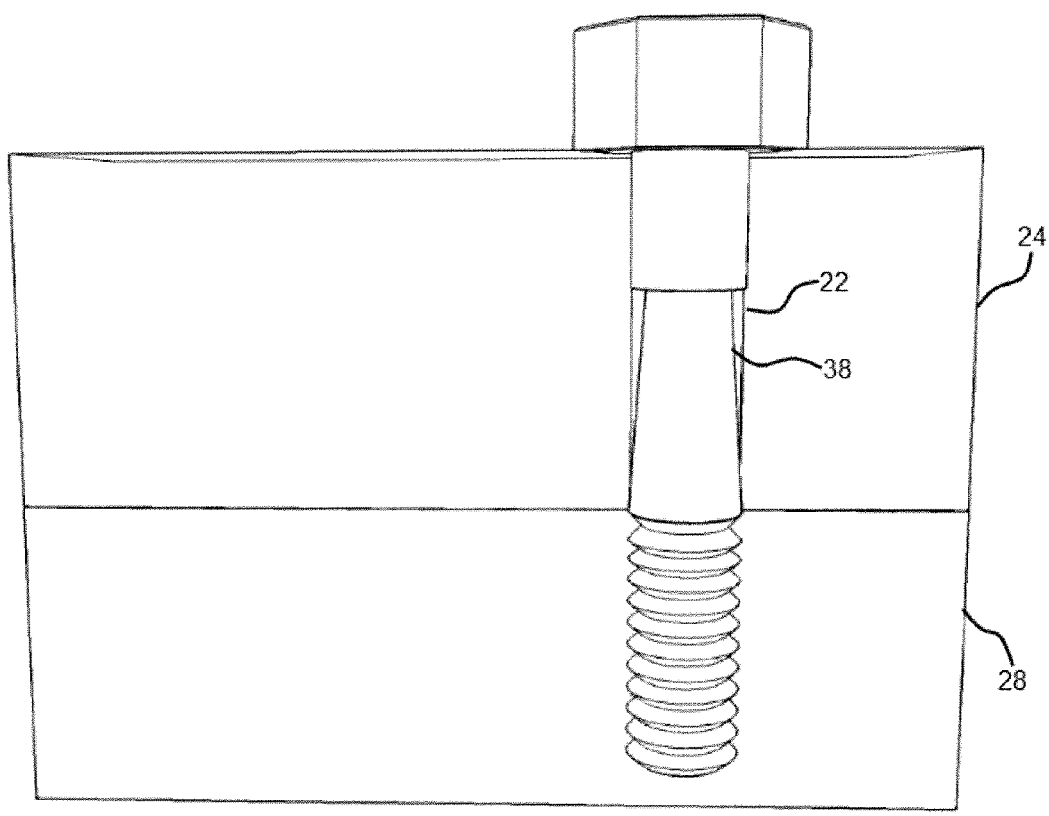
FIG. 2 is an isometric view of one embodiment of the disclosure with the plates shown in a cutaway view and the jaws removed.
Figure 4:
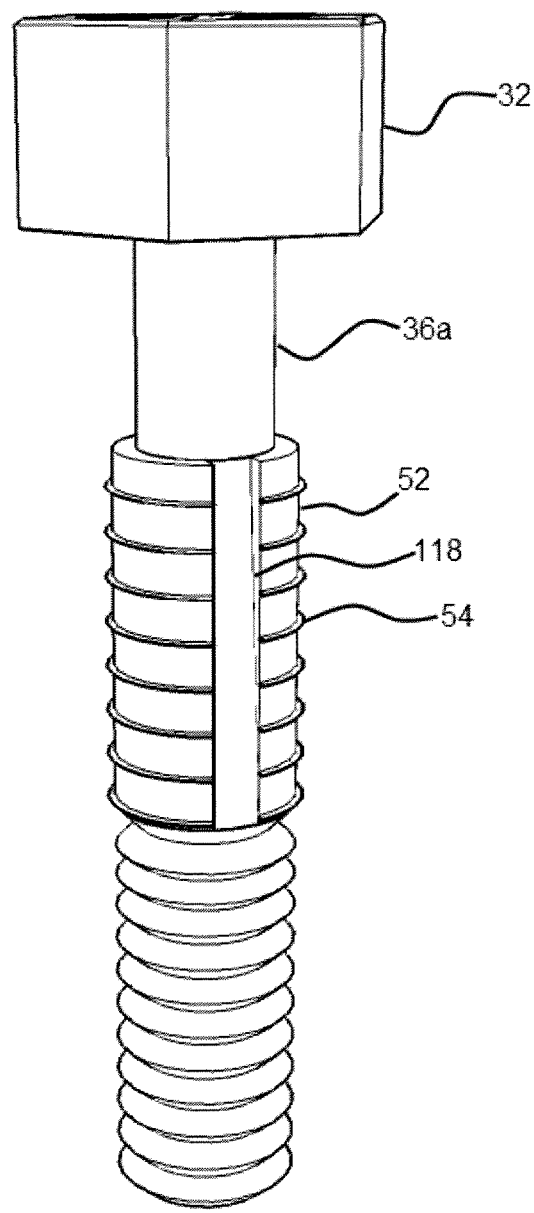
FIG. 4 is an isometric view of one embodiment of the disclosure with the split tube removed to show the cylindrical region of the bolt portion.
Figure 5:
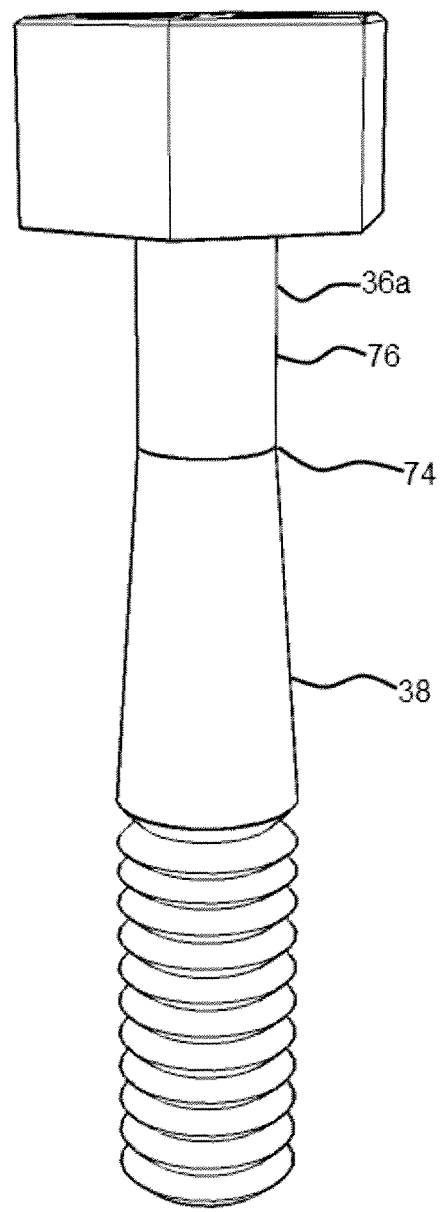
FIG. 5 is an isometric view of one embodiment of the disclosure with the plates, split tube, and jaws removed to show the bolt portion.
Figure 6:
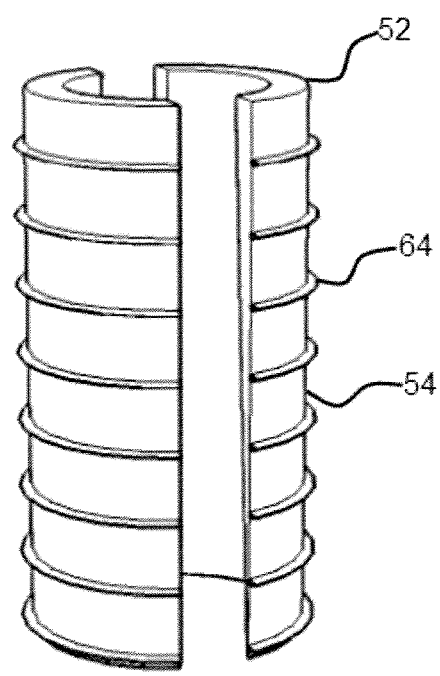
FIG. 6 is an isometric detail view of the jaws in one form.

Looking to FIG. 4, a bolt 32 is shown wherein the cylindrical region 36a is substantially smaller in diameter than the outer diameter 52 of the jaws 54. This is shown in more detail in FIG. 5, where the smallest diameter 74 of the tapered region 38 is substantially equivalent to the outer diameter 76 of the cylindrical region 36a. This may be more easily seen in FIG. 2, where the jaws 54 have been removed to show the position of the tapered region 38 within the smooth borehole 22 of the non-threaded plate 24.

To further engage the teeth 64 within the smooth borehole 22, a sliding member may be disposed between the head portion 34 and the jaws 54 and pressed downward 78, as shown in FIG. 1. While several mechanisms could be utilized, the split tube 46 shown in FIG. 7, as well as FIGS. 1 and 8, could be utilized for such a function. Once again, a tool, wedge, threaded mechanism, or other apparatus could be so utilized to force the split tube 48 downward 78 or to force the jaws 54 without the split tube 46.

Figure 9:
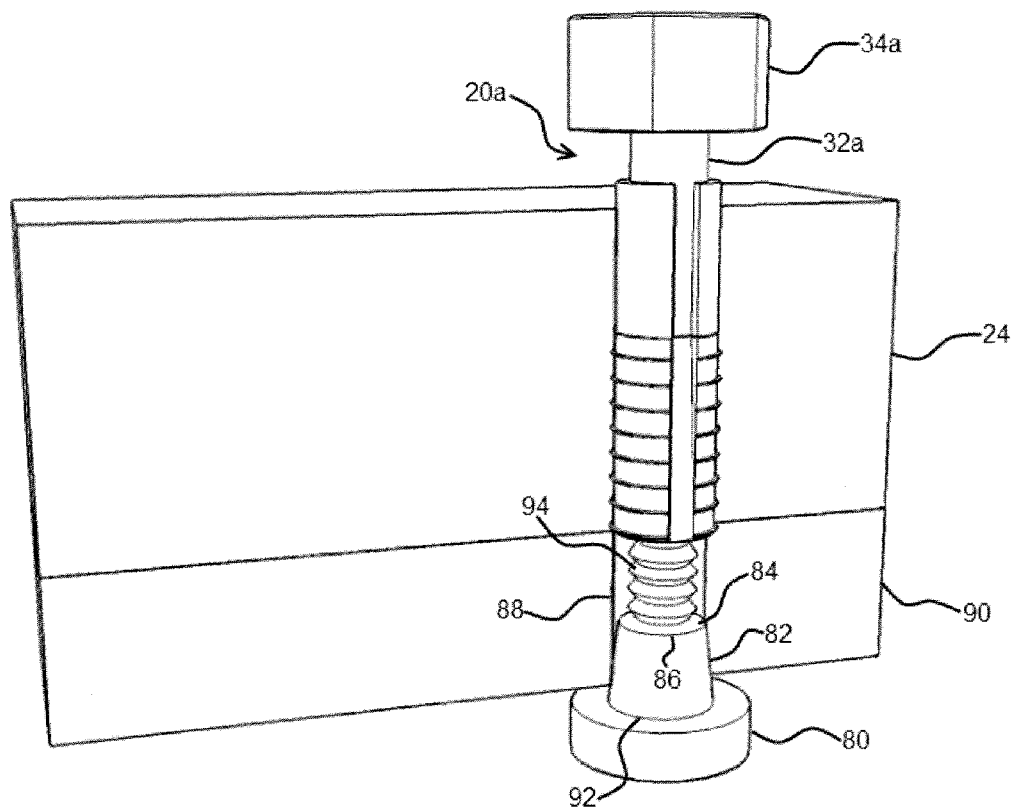
FIG. 9 is an isometric view of the tool in another embodiment separating plates without a threaded bore.

Another embodiment is shown in FIG. 9 comprising a threaded element 80 having a surface 82 and a threaded bore 84. In one form, the tapered surface 82 is cone shaped having a minor diameter 86, which is smaller than the smooth borehole 88 in the plates 24 and 90 and further has a major diameter 92, which is substantially larger than the diameter of the smooth borehole 88. In this embodiment, the bolt 32 is inserted as previously described, but is threaded into the female threaded, tapered element 80 rather than into the lower plate. In this embodiment, the tool is utilized where non-threaded through holes exist in both plates to be separated, rather than one plate being separated as detailed in the first embodiment, shown in FIGS. 1 and 8.

To decrease the frictional coefficient between the gripping inserts 54, and the tapered region 38, lubricants, bearings, or other materials could be inserted therebetween. For example, needle bearings 118 could be inserted as shown in FIG. 4. Such needle bearings are well known in the art.

In this embodiment, the threaded portion 94 of the tool 20a is of smaller diameter than would be utilized if the hole 88 was threaded, as in the first embodiment. The smaller diameter of the threaded portion 94 allows for the threaded tapered element 80 to be positioned within the smooth borehole 88.

The tapered element 80 may be anchored to the plate 90 by wedges, external cutting threads, teeth, or such expanding apparatus as might be described elsewhere in this invention or as may be known in the art. With the bolt 32a threaded into the tapered element 80 which is in-turn firmly anchored into the plate 90, the plates 90 and 24 may easily be separated, as previously described.

Figure 10:
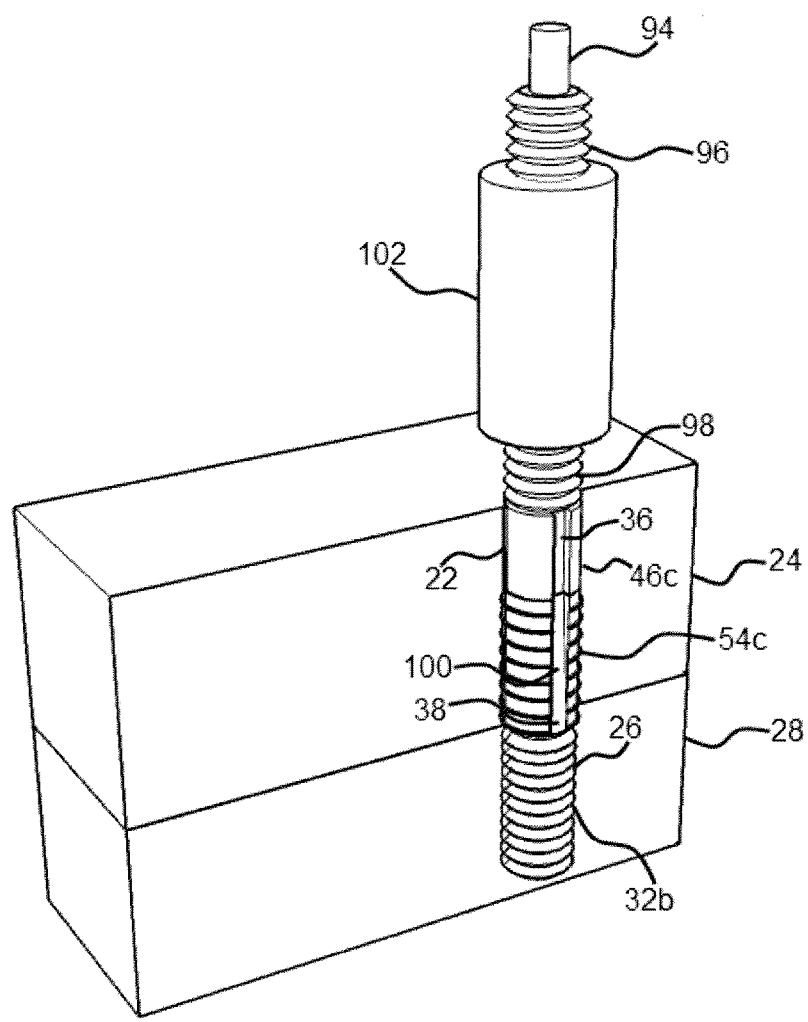
FIG. 10 is an isometric view of another embodiment of the tool.
Figure 11:
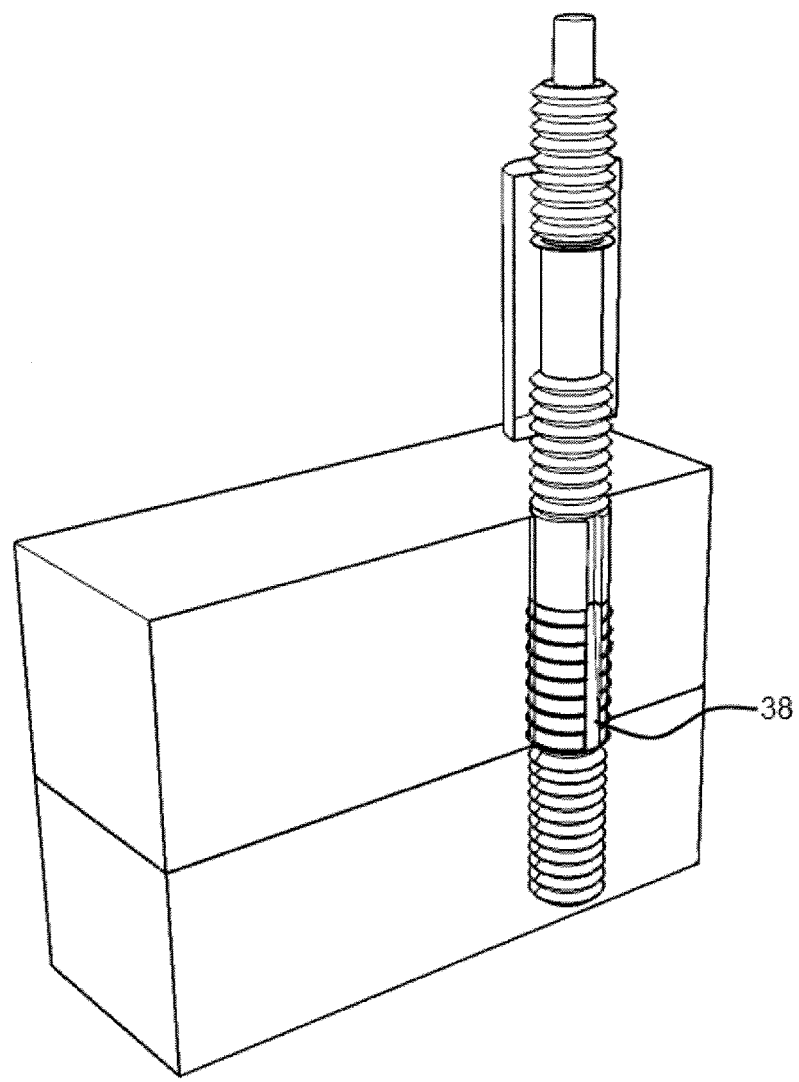
FIG. 11 is an isometric, partial cutaway view of another embodiment of the tool.

Looking now to another embodiment shown in FIGS. 10 and 11, this embodiment represents a greater departure from the first embodiment in that this embodiment utilizes two separate interoperating components to result in the separating force between the plates 24 and 28.

In this embodiment, the bolt 32b may be formed in a similar manner to the previous bolt and then drilled lengthwise to produce a hole through the entire length of the bolt. The head portion 34 (34a in FIG. 9) of the previous embodiments is omitted, as well as the threaded portion 44 previously shown. In this embodiment, the tapered region 38 remains with the previously mentioned hole drilled therethrough as well as the cylindrical region 36.

Initially, a shaft 94 is threaded into the threaded hole 26, as previously described, and extends upwards through the smooth borehole 22 in the non-threaded plate 24. A shaft 94 continues upward and comprises a threaded portion 96. Furthermore, the shaft 94 comprises a rod like member which extends through the tube 46c as well as the jaws 54c. In this embodiment, the tube 46 need not be split, but could be a unitary structure connected to a threaded portion 98. As with other embodiments, the bolt itself, or other components other than the split tube 46 could be utilized to reposition the jaws 54c. As the jaws 54c will need to expand outward upon downward force thereupon, it may be most desirous to have them be interoperating components. A slider 100 comprises the tapered region 38, the cylindrical region 36, and the threaded portion 98

Once the shaft 94 is firmly seated (threaded) into the plate 28, and the jaws 54c are firmly engaged with the plate 24, the threaded portion 96 of the shaft 94, and the threaded portion 98 of the slider 100. can be drawn together. This can be accomplished by providing opposing threads in threaded portions 96 and 98 and providing a dual threaded nut 102 thereupon. Thus, once the nut 102 is rotated, the threaded portions 96 and 98 will be drawn together (or pulled apart if rotated in the opposing direction), thus providing a separating force between the plates 24 and 28.

Figure 12:
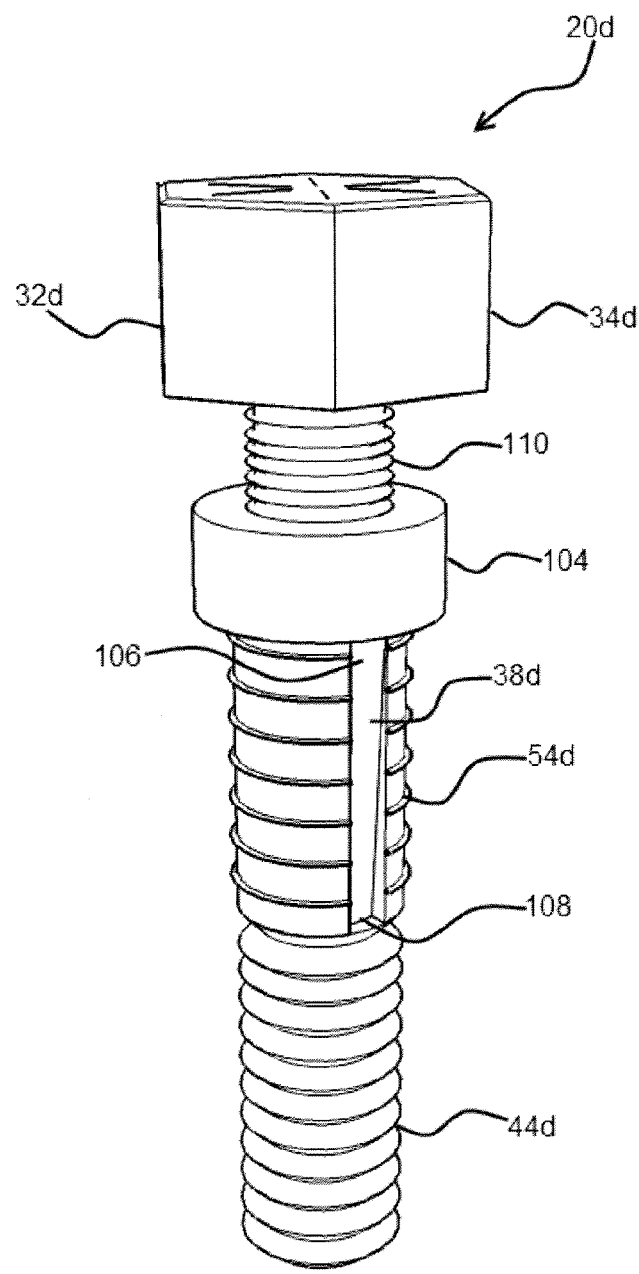
FIG. 12 is an isometric view of another embodiment of the tool.
Figure 13:
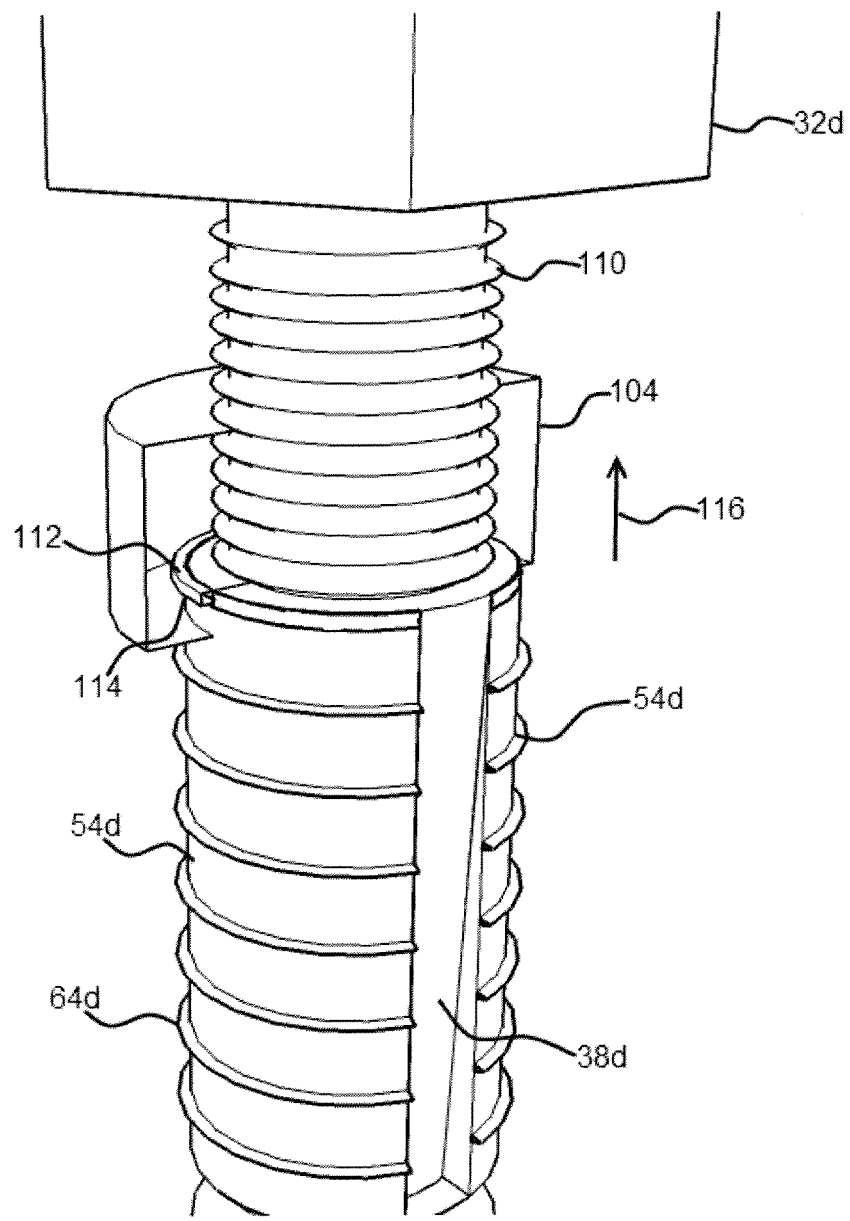
FIG. 13 is an isometric, partial cutaway view of another embodiment of the tool.

Another embodiment is shown in FIGS. 12 and 13. One significant difference in this is the tapered region 38d has the larger portion at the uppermost edge 106 and the narrower portion at the lower end 108. Thus, the jaws 54d are inverted from previous embodiments. The head portion 34d and threaded portion 44d are substantially the same as in previous embodiments. As shown, the bolt 32d further comprises a plurality of threads 110 around what was previously a cylindrical region 36 in previous embodiments. The threads 110 are configured to interoperate with a nut 104.

Looking to FIG. 13, it can be seen how the jaws 54d comprise a protrusion 112, which is configured to interoperate with a channel 114 within the nut 104. As shown, the nut 104 has a substantially cylindrical outer surface, however, non-cylindrical surfaces may be utilized to be able to adapt to a tool for further rotation and tensioning. In use, the tool 20d is threaded into the lower threads of a plate, as previously described, whereupon the nut 104 is rotated so as to move it in a vertically upward direction 116, thus drawing the jaws 54d therewith. As the jaws 54d are drawn upward 116, they tend to reposition outward such that the teeth 64d engage the smooth bore of the upper plate, as previously described, and engaging therewith. Thus, as the bolt 32d is rotated, the jaws remain affixed to the upper plate, while the nut 104 rotates with the bolt 32d, thus creating tensional force between the two plates and separating them, as previously described.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A tool for physically separating a plurality of plates; the tool comprising:
   a. a modified bolt comprising a first end threaded portion and a second end non-cylindrical head portion longitudinally opposed to the threaded portion;
   b. wherein the threaded portion is configured to interoperate with a borehole within a first plate of the plurality of plates to be separated;
   c. the modified bolt comprising a frustoconical smooth surface tapered region between the threaded portion and the head portion, with the tapered region narrowing in diameter toward the head portion;
   d. a plurality of gripping inserts having an inner frustoconical surface operably configured to interoperate with the tapered region of the modified bolt so as to allow free rotation of the modified bolt within the gripping inserts;
   e. wherein the gripping inserts further comprise an outer surface having a toothed surface configured to engage an inner surface of a borehole within a second plate of the plurality of plates; and
   f. wherein the tool produces compressive forces within the modified bolt to generate tensile forces between the first plate and the second plate when operated.

2. The tool as recited in claim 1 wherein the modified bolt further comprises a smooth surface cylindrical region longitudinally positioned between the head portion and the tapered region.

3. The tool as recited in claim 2 further comprising a split tube having an inner diameter substantially equivalent to an outer diameter of the smooth surface cylindrical region to interoperate therewith.

4. The tool as recited in claim 1 further comprising a plurality of bearings positioned between the gripping inserts and the smooth surface tapered region of the modified bolt.

5. The tool as recited in claim 4 wherein the bearings are needle bearings.

* * * * *